United States Patent

Rezkallah et al.

[11] Patent Number: 5,441,103
[45] Date of Patent: Aug. 15, 1995

[54] TWO-PHASE FLOW HEAT EXCHANGE

[75] Inventors: Kamiel Rezkallah; Robert W. Besant, both of Saskatoon, Canada

[73] Assignee: Mechanical Engineering Dept., Saskatoon, Canada

[21] Appl. No.: 94,055

[22] PCT Filed: Dec. 11, 1991

[86] PCT No.: PCT/CA91/00438
§ 371 Date: Jul. 19, 1993
§ 102(e) Date: Jul. 19, 1993

[87] PCT Pub. No.: WO92/11494
PCT Pub. Date: Jul. 9, 1992

[30] Foreign Application Priority Data

Dec. 24, 1990 [GB] United Kingdom ............... 9028077

[51] Int. Cl.$^6$ ............................................. F28D 15/00
[52] U.S. Cl. .................... 165/104.29; 165/109.1; 165/908
[58] Field of Search ............ 165/104.12, 104.29, 165/109.1, 908, 911

[56] References Cited

U.S. PATENT DOCUMENTS

| | | | |
|---|---|---|---|
| 1,935,053 | 11/1933 | Jaeger | 165/104.29 |
| 3,725,566 | 4/1973 | Plizak | 165/109.1 |
| 3,788,393 | 1/1974 | Plizak | 165/109.1 |
| 4,365,666 | 12/1982 | Seifert | 165/104.29 |
| 4,630,672 | 12/1986 | Kaufmann | 165/908 |
| 4,741,385 | 5/1988 | Bergles et al. | 165/908 |

FOREIGN PATENT DOCUMENTS

| | | |
|---|---|---|
| 2410391 | 9/1975 | Germany . |
| 1006459 | 10/1965 | United Kingdom . |
| 1121909 | 7/1968 | United Kingdom . |
| 254535 | 10/1969 | U.S.S.R. ............... 165/908 |

OTHER PUBLICATIONS

Japanese Abstracts, JP 790019906, vol. 004164, Publ. No. JP 55112996 Sep. 1980 (Shigeru).

Primary Examiner—A. Michael Chambers
Attorney, Agent, or Firm—Murray E. Thrift; Adrian D. Battison; Stanley G. Ade

[57] ABSTRACT

A heat exchange process and apparatus are especially suited for use in heat recovery applications, especially in a run-around heat exchanger. The run-around heat recovery system has two liquid to gas heat exchangers, one for heat transfer with stale air being exhausted and one for heat transfer with fresh air being taken in. The two heat exchangers are linked with a common coupling liquid so that heat may be extracted from one of the air flows and added to the other. To improve the heat transfer process, a gas is injected into the liquid just before it enters one or both of the heat exchangers. The resultant mixed phase flow produces a much higher heat transfer coefficient in the heat exchangers, yielding a significant improvement in the system performance.

25 Claims, 4 Drawing Sheets

TWO-PHASE FLOW HEAT EXCHANGE

FIELD OF THE INVENTION

The present invention relates to improvements in heat exchange apparatus and processes.

BACKGROUND

The invention has particular application to heat recovery in building ventilation systems but is also applicable to industrial processes and the like.

The heating and cooling of buildings, particularly at high latitudes, is a major cause of high consumption of fossil fuels. With the escalating global concerns about pollution and climatic changes due to the accumulation of green house gases in our atmosphere, and the rising concerns over reliable, reasonable cost oil supplies, more attention is being given to heat recovery from exhaust air. In a typical run-around building heat recovery system, heat is recovered from exhaust air using an exhaust heat exchanger and is added to incoming fresh air using a supply heat exchanger. The medium for heat transport is usually an aqueous glycol solution of 30% glycerine by weight in order to prevent freezing at temperatures below 0° C. These systems are also used to cool incoming fresh air in air-conditioned buildings.

The new ASHRAE standard for indoor air quality (ASHRAE standard 62–89) calls for increasing air ventilation rates in most buildings by a factor of three when compared with the former standard. This results in a much higher cost of energy to heat (or cool) the incoming air into buildings. While the efficiency of heat recovery ventilators in small buildings and residential dwellings may now reach as high as 90%, it rarely exceeds 50% in large commercial buildings due to many factors. These include an excessively high glycol content in the coupling fluid, producing a high thermal capacity rate, and hence reducing the thermal transport rate to the air side of each heat exchanger. Another factor is condensation and frost accumulation on the exhaust heat exchanger. One way of significantly increasing the overall effectiveness of the system would be to increase the liquid-side heat transfer coefficient.

Additionally, the optimum overall efficiency of a run-around system could be improved if the ratio between the heat capacity rate of the liquid side to the heat capacity rate of air could be brought closer to unity. In a typical heat exchanger, where a single-phase liquid flow is commonly used, this ratio is usually two or even higher.

A parameter known as the "Number of Transfer Units" is commonly used in the equations used for calculating the effectiveness of a heat exchanger. This parameter, N, is calculated by multiplying the overall heat transfer coefficient, U, in a heat exchanger (explained in the following detailed description) by the heat exchanger total heat transfer area and dividing by the minimum heat capacity of either the liquid or the air stream. Since the minimum heat capacity in the system is usually that of the supply air, no dramatic changes could be made to this value. However, the number of transfer units in each heat exchanger, and hence the overall effectiveness of the run-around system, could be significantly increased if the overall heat transfer coefficient U is increased.

It has now been found that a two-phase coupling fluid may be used to achieve the desired objectives.

SUMMARY

According to one aspect of the present invention there is provided in a heat exchange process for a liquid to gas heat exchanger comprising passing a liquid through a first side of the heat exchanger and passing a first gas through a second side of the exchanger for heat exchange with the liquid, the invention comprising pressurizing a second gas and injecting the second gas under pressure into the liquid passing through the heat exchanger to provide a forced-convective two-phase flow through the first side of the heat exchanger.

According to another aspect of the present invention there is provided a heat exchange apparatus comprising: a liquid to gas heat exchanger with a liquid side including a plurality of liquid carrying tubes and a gas side; liquid flow divider means for passing uniform flows of liquid through the respective tubes of the liquid side of the heat exchanger; means for passing a first gas through the gas side of the heat exchanger; compressor means for pressurizing a second gas; and injector means for injecting the second gas under pressure into the respective flows of liquid before the liquid passes through the heat exchanger tubes.

According to a further aspect of the present invention there is provided a heat recovery system comprising: exhaust means for exhausting spent gas; inlet means for admitting fresh gas; exhaust heat exchange means operatively associated with the exhaust means for extracting heat from the spent gas; inlet heat exchange means operatively associated with the inlet means for supplying heat to the fresh gas; circulating means for circulating a coupling liquid sequentially through the exhaust and inlet heat exchanger means; means for injecting gas under pressure into the coupling liquid upstream of at least one of the heat exchangers; and means for withdrawing the gas from the coupling liquid downstream of at least one of the heat exchangers.

Embodiments of the invention may thus provide improved run-around heat-recovery systems for use, for example, in commercial and industrial buildings and industrial processes wherein waste heat from an exhaust gas stream is transferred to a supply stream by circulation of a mixture of liquid, for example an aqueous glycol solution, and a gas, for example air, through a first heat exchanger, located in the exhaust stream, and through a second heat exchanger, located in the supply air stream.

The higher heat-transfer coefficients associated with the two-phase flow coupling fluid are attributed to the increased mixing of the liquid phase caused by the addition of the gas phase. The gas bubbles, with the lower density will travel faster in the liquid causing good mixing of the liquid, and will effectively move or exchange the warmer (or cooler) fluid near the tube wails to the main stream of the bulk fluid flow in each tube. This in turn augments the heat exchange process between the tube walls and the coupling fluid.

The primary, benefits of this invention may be summarized as follows:

(i) By using a two phase, liquid-gas coupling fluid instead of liquid alone, the thermal heat capacity rate of the "liquid" side (the two-phase mixture in this case) can be controlled and set equal to that of the air side; thus enhancing the effectiveness of the system.

(ii) The "liquid" side heat transfer coefficient in both the supply and exhaust heat exchangers is greatly enhanced by the introduction of the gas phase. It has been shown that the heat transfer coefficient in two-phase, gas-liquid flows could be several times higher than that of the single-phase flow at the same liquid mass flow rate. Thus, the overall heat transfer coefficient in each heat exchanger, and hence the overall efficiency of the system can be significantly increased when a two-phase coupling fluid is used.

BRIEF DESCRIPTION OF THE DRAWINGS

In the accompanying drawings, which illustrate a prior art system and an exemplary embodiment of the present invention.

DETAILED DESCRIPTION

Figure 1:
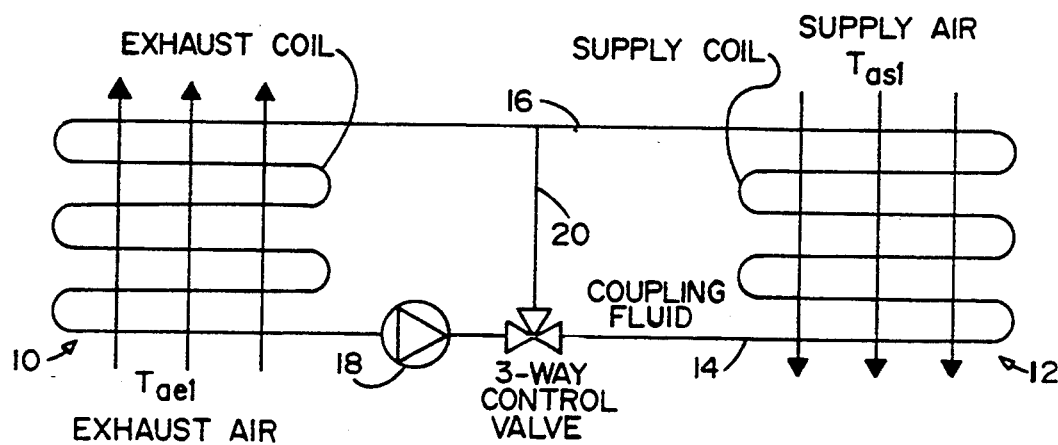
FIG. 1 is a schematic of a prior art run-around heat recovery system.
Figure 2:
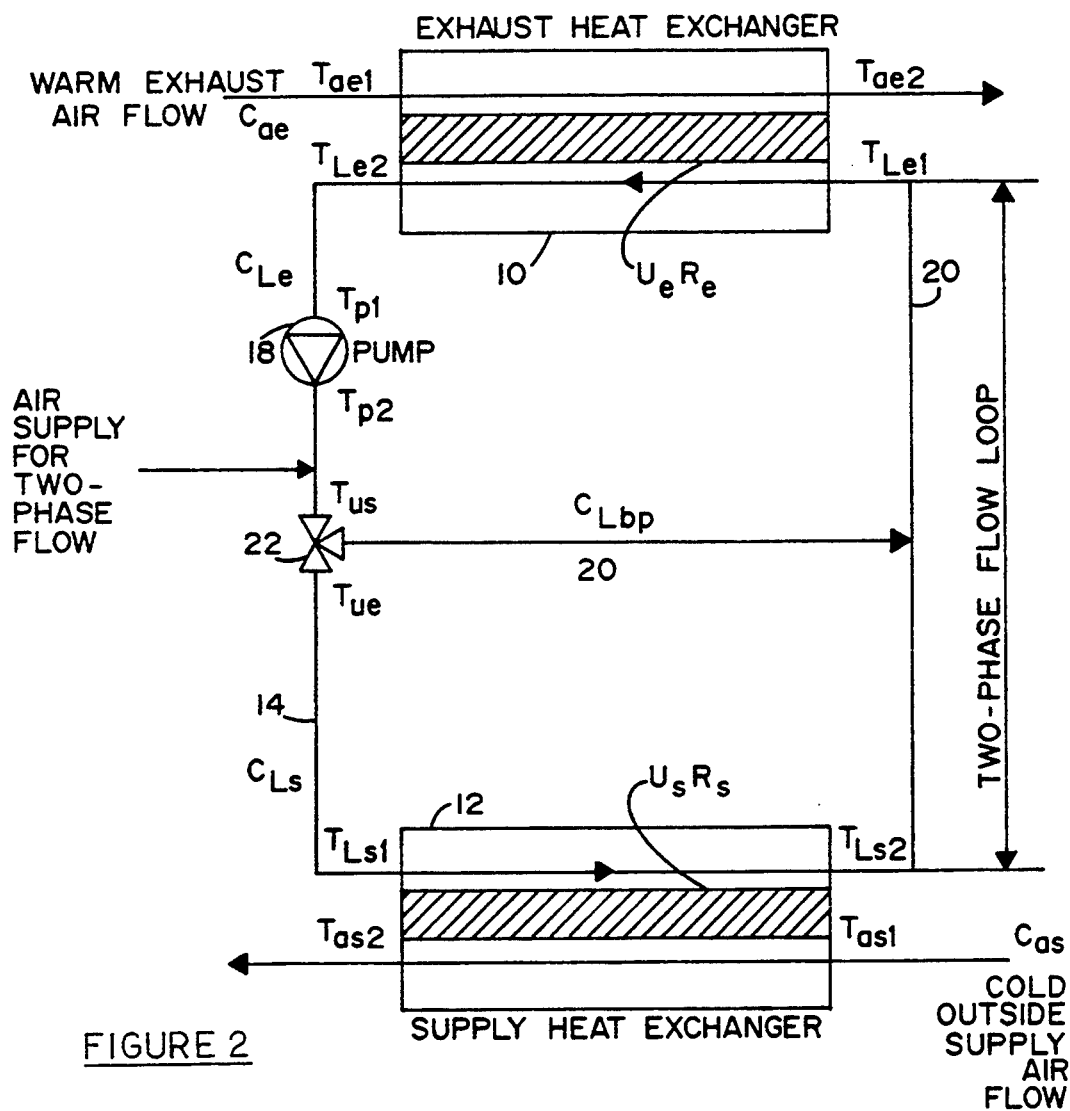
FIG. 2 is a schematic of the thermal circuit of the system.

Referring to the accompanying drawings, FIG. 1 shows a schematic of a typical prior art run-around system which is used, in this case, during the heating season to recover heat from exhaust air. It consists of two finned-tube heat exchangers, an exhaust heat exchanger 10 and a supply 12. The heat exchangers are connected in a loop by lines 14 and 16. Line 14 contains a pump 18. Downstream of the pump is a bypass line 20, connected to line 16 and coupled to line 14 by a three-way bypass control valve 22. The heat exchangers 10 and 12 are thermally connected by a coupling fluid which is pumped around the loop by pump 18. The bypass valve 22 is used to control the rate of heat transfer to the supply air when the energy available from the exhaust air is more than what is needed. FIG. 2 shows the thermal circuit of the run-around system. In both exhaust heat exchanger 10 (where subscript e appears), and the supply heat exchanger 12 (where subscript s appears), heat is exchanged between the liquid (given the subscript L) and the air (given the subscript a). In the exhaust heat exchanger 10, the warm exhaust air flow enters the heat exchanger at temperature $T_{ae1}$ and is cooled down to temperature $T_{ae2}$ as a result of heat exchange with the liquid while the temperature of the latter increases from the inlet temperature $T_{Le1}$ to $T_{Le2}$. The overall heat transfer rate for this process per unit temperature difference is designated as $U_eA_e$, which is product of the overall heat transfer coefficient in the exhaust heat exchanger $U_e$ and the heat transfer area $A_e$. Similarly for the supply 12, the overall heat transfer rate per unit temperature difference is $U_sA_s$. The heat capacity rate of the exhaust air at the inlet condition is $C_{ae}$, that for the supply air is $C_{as}$, and the liquid existing the exhaust heat exchanger is $C_{Le}$, and entering the supply heat exchanger is $C_{Ls}$. For the bypass flow, the heat capacity rate is $C_{Lbp}$. For the case of the two-phase flow mixture flowing through the heat exchanger liquid side, the subscript L refers to the liquid-gas mixture instead of liquid alone.

Figure 3:
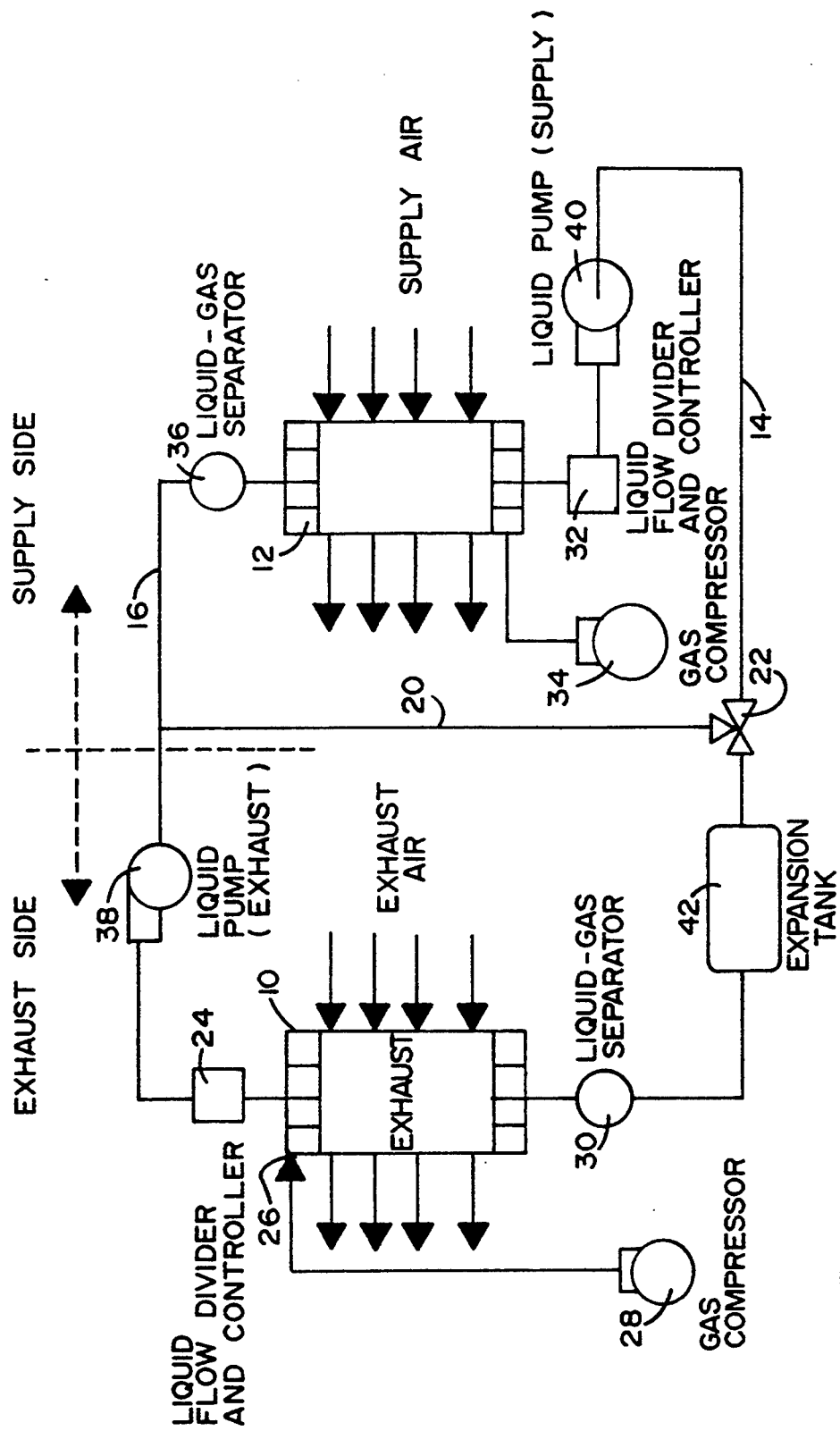
FIG. 3 is a schematic of a system according to the present invention.

FIG. 3 is a schematic of one embodiment of the present run-around heat-recovery system. The system includes a liquid flow divider and controller 24 upstream of the exhaust heat exchanger 10. This produces a uniform flow through the tubes of the multi-tube heat exchanger 10. At the inlet of the heat exchanger, compressed gas is injected into the liquid flows, at 26, from a compressor 28. The gas is injected at a rate that will yield an equal "quality" in each tube. (The term "quality" or "gas quality" is defined as the ratio of the gas mass flow rate to the total liquid and gas mass flow rate.) The introduction of the gas under pressure into the liquid stream produces a forced-convective two-phase flow in which the highly aerated mixture is mechanically forced through the heat exchanger loop by a pump. Downstream of the exhaust heat exchanger 10 is a liquid-gas separator 30 that separates the gas from the liquid. Similarly, a liquid flow divider 32 is provided upstream of the supply heat exchanger 12, air is injected at the inlet of the supply heat exchanger 12 from a compressor 34, and a liquid-gas separator 36 is located downstream of the supply heat exchanger 12. The system includes two liquid pumps, an exhaust pump 38 for pumping liquid into the flow divider 24, and a supply pump 40 for pumping liquid into the liquid flow divider 32. An expansion tank 42 is inserted in the line from the separator 30 to the pump 40.

For heating purposes, thermal energy is transferred from the warm exhaust air to the two-phase mixture flow in the exhaust heat exchanger 10. The two-phase mixture then flows to the separator and the liquid flows on to the supply heat exchanger inlet, where gas is injected before heat is transferred from the warm mixture of liquid and gas to the cooler incoming fresh air. The main heating load is provided by the heating system heat exchanger in the building (usually provided by steam from a boiler).

The gas-to-liquid volumetric ratio of the two-phase mixture is predetermined such that the desired heat transfer rates in the heat exchangers can be achieved. Such values of the coupling fluid heat transfer coefficients and the corresponding gas-liquid volume flow rates have been obtained from experimental runs using a laboratory simulated heat-recovery loop. This ratio may be controlled by adjusting the liquid flow rate, using the valve control system, while maintaining the air flow rate at a fixed value.

Figure 4:
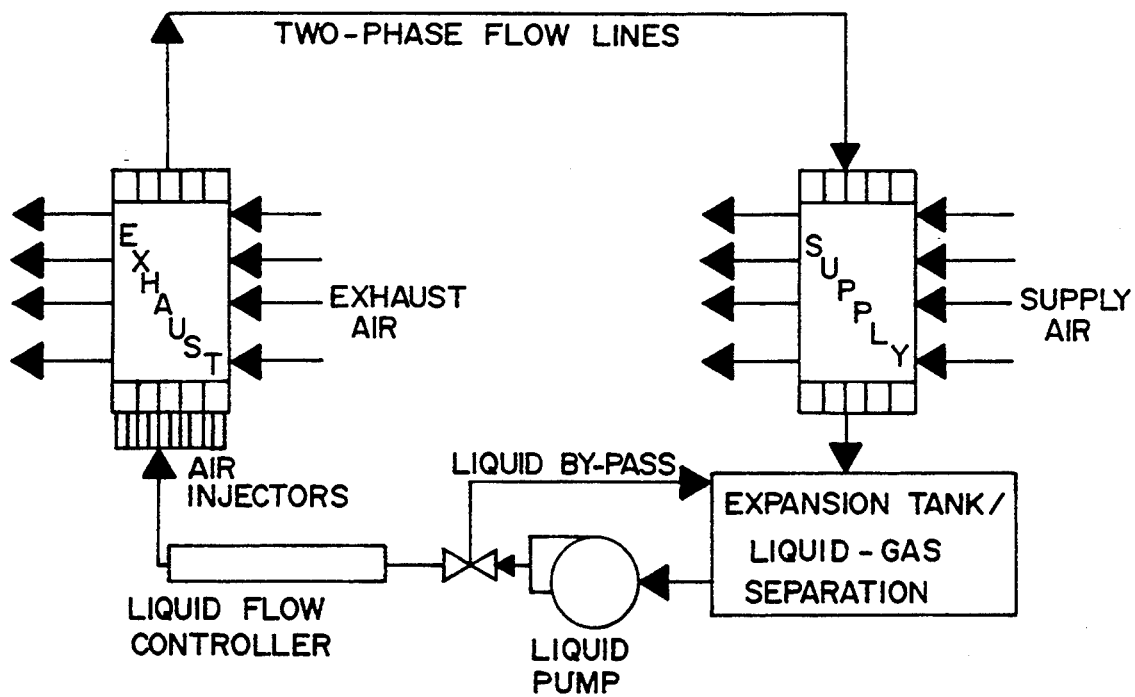
FIG. 4 is a schematic of another embodiment of a system according to the invention.
Figure 5:
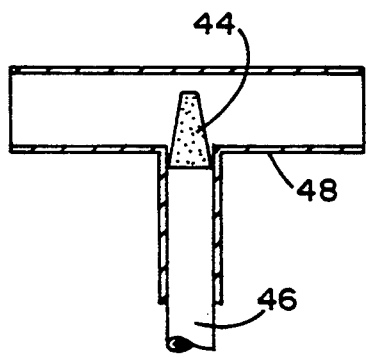
FIG. 5 is a part sectional view of a gas injector.

FIG. 4 shows another embodiment of the system. In this embodiment, the warm two-phase flow mixture, after leaving the exhaust heat exchanger 10, is transported directly to the supply heat exchanger 12 via a bundle of tubes equal in number to the number of heat exchanger tubes in parallel "n". The thermal energy of the two-phase mixture is then transferred to the cold supply air in the supply heat exchanger 12 resulting in warming of the supply air. The mixture then flows to an expansion tank 42 where the gas is vented and the liquid is recirculated by the pump 38. From the pump, the liquid is pumped back into the loop via a liquid flow controller 24. The liquid is then equally distributed to the "n" number of tubes (or lines) and the gas is injected at a rate to yield an equal "quality" in each coil tube. The two-phase mixture then flows through the exhaust heat exchanger, absorbing heat from the exhaust air. A bypass valve 22 returns excess liquid to the expansion tank.

In this embodiment the liquid-gas mixture is separated only once downstream from the supply heat exchanger compared to the previously described embodiment in which a separation process is needed at the exit of each heat exchanger. This configuration is simpler, but it has practical limitations in applications where long distances separate the two heat exchangers.

A gas injector is illustrated in Fugure 5. The injector is a frusto-conical cap 44 made of sintered bronze. Such caps are commonly used as filters for gasoline regulating gauges. The cap is soldered to the end of a gas supply tube 46. The latter is then mounted inside a tee 48, and the whole assembly is mounted in a liquid line close to the tube entrance of the heat exchanger. Each liquid line is equiped with an injector of this type.

Figure 6:
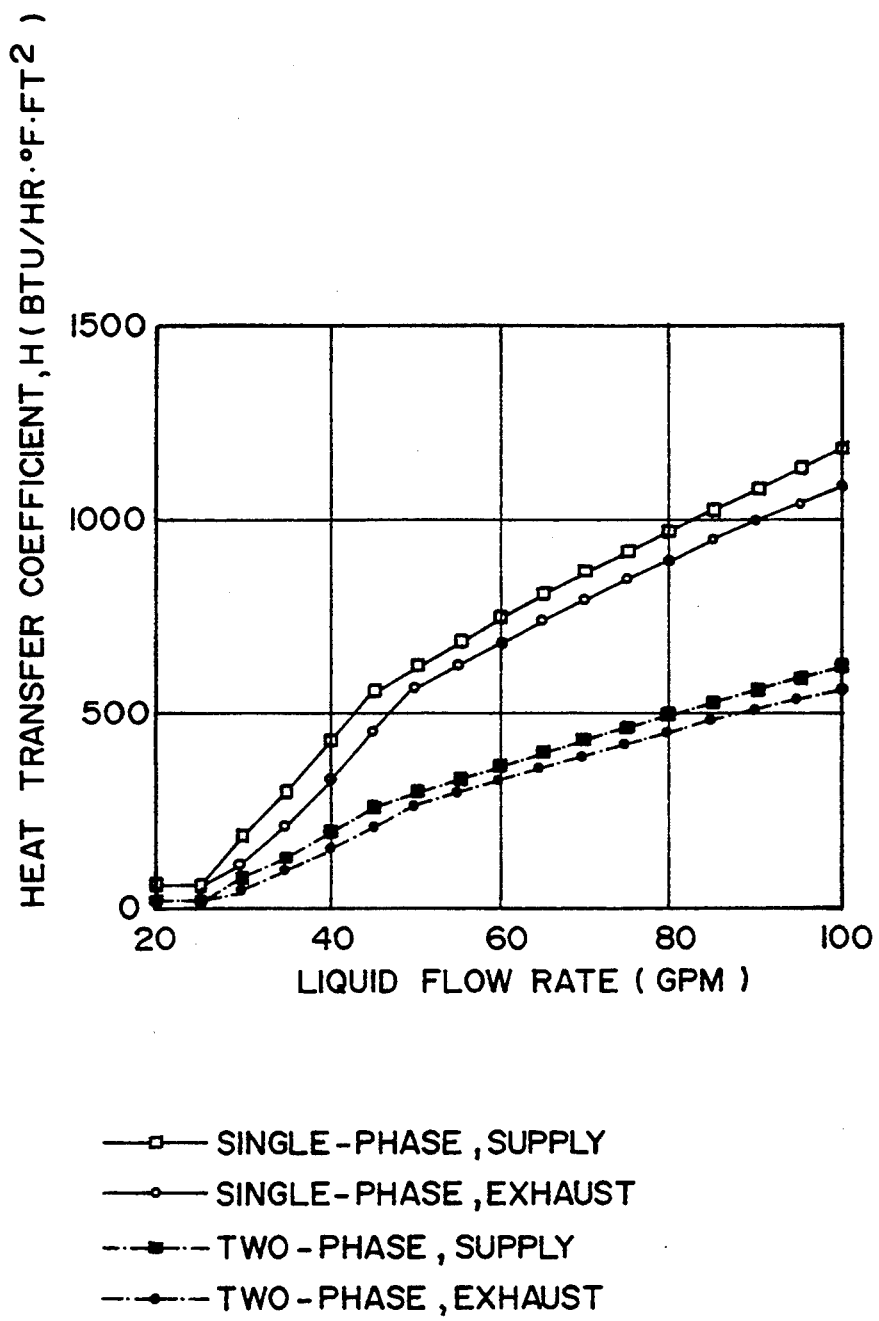
FIG. 6 is a graphical comparison of the prior art and the present heat transfer coefficients.

FIG. 6 shows a comparison between the heat transfer coefficients in the exhaust and supply exchangers when the coupling fluid is changed from a single-phase to two-phase flow. The results are taken from a simulation study in which actual operating conditions of an existing run-around system were used.

If Ethylene-glycol and air are used as the coupling fluid, there is a possibility that the Ethylene glycol will deteriorate due to oxidization effects caused by continuous air injection. If this problem arises, it can be avoided by using a non-reacting gas such as nitrogen. The nitrogen will be recirculated using a compressor after separation takes place in the expansion tank.

OPERATING FEATURES OF THE RUN-AROUND SYSTEM (Refer to FIGS. 3 and 4 for the components identification)

1. The coupling liquid is pumped around the run-around system at a rate controlled by the flow control bypass valve 22 using pumps sized to provide a coupling liquid flow rate such that the thermal capacity ratio for each heat exchanger is substantially equal to 1 when no flow is bypassed.

2. The coupling liquid flow is divided equally to each tube in each heat exhanger.

3. Pressurized gas is injected into the coupling liquid flow in each tube of each heat exchanger in such a manner that the gas flow is distributed equally in the tubes. It is preferred that the rate of gas injection will result in a mass ratio between the gas and the coupling liquid flow of at least 0.0001.

4. The rate of coupling liquid flow and gas flow in each heat exchanger is adjusted to maximize the total heat exchange between heat exchangers or in the case that the required load is met, to reduce the total heat exchange between the heat exchangers.

5. The mixed gas and coupling liquid are separated after flow through the supply heat exchanger, and possibly through the exhaust heat exchanger as well.

While particular embodiments of the invention have been described in the foregoing, the invention is not to be considered limited to them. The invention is to be considered limited solely by the scope of the appended claims.

We claim:

1. In a heat exchange process comprising providing a liquid to gas heat exchanger having a liquid side including a plurality of liquid carrying tubes and a gas side and passing a liquid through the tubes of the liquid side of the heat exchanger and passing a first gas through the gas side of the exchanger for heat exchange with the liquid, the invention comprising pressurizing a second gas and injecting the second gas under pressure into the liquid passing through the liquid side of the heat exchanger to provide a two-phase flow through the side of the heat exchanger and controlling heat transfer between the liquid and gas sides of the heat exchanger by controlling the ratio of second gas to liquid passing through the liquid side of the heat exchanger.

2. A process according to claim 1 comprising delivering the mixture of the second gas and liquid to a second liquid to gas heat exchanger, passing the mixture through one side of the second heat exchanger, pressurizing a third gas and passing the third gas through the other side of the second heat exchanger.

3. A process according to claim 2 comprising separating the second gas from the liquid after the mixture has passed through the second heat exchanger.

4. A process according to claim 3 comprising recycling the liquid from the second heat exchanger to the first heat exchanger.

5. A process according to claim 2 wherein the mass ratio of the third gas to the liquid is at least 0.0001.

6. A process according to claim 1 wherein the thermal capacity ratio for each heat exchanger is substantially 1.

7. A process according to claim 1 wherein the mass ratio of the second gas to the liquid is at least 0.0001.

8. In a heat exchange process for a liquid to gas heat exchanger comprising passing a liquid through a first side of the heat exchanger and passing a first as through a second side of the exchanger for heat exchange with the liquid, the invention comprising pressurizing a second gas and injecting the second gas under pressure into the liquid passing through the heat exchanger to provide a two-phase flow through the first side of the heat exchanger and separating the second gas from the liquid after the mixture of second gas and liquid has passed through the heat exchanger.

9. A process according to claim 8 comprising delivering the liquid to a second liquid to gas heat exchanger, pressurizing a third gas, injecting the third gas under pressure into the liquid, passing the mixture of third gas and liquid in a two-phase flow through a first side of the second heat exchanger and passing a fourth gas through a second side of the second heat exchanger.

10. A process according to claim 9 comprising separating the third gas from the liquid after the mixture of third gas and liquid has passed through the second heat exchanger.

11. A process according to claim 3 comprising recycling the liquid from the second heat exchanger to the first heat exchanger.

12. A process according to claim 9 wherein the mass ratio of the third gas to the liquid is at least 0.0001.

13. A heat exchange apparatus comprising:

heat exchange means including at least one liquid to gas heat exchanger with a liquid side including a plurality of liquid carrying tubes and a gas side;

liquid flow divider means for passing uniform flows of liquid through the respective tubes of the liquid side of the heat exchanger;

means for passing a first gas through the gas side of the heat exchanger;

compressor means for pressurizing a second gas;

injector means for injecting the second gas under pressure into the respective flow of liquid before the liquid passes through the heat exchanger tubes; and gas separator means for receiving the mixture of second gas and liquid from the heat exchange means and separating the second gas from the liquid.

14. Apparatus according to claim 13 wherein:

the heat exchange means comprises:
  a first liquid to gas heat exchanger with a liquid side including a plurality of liquid carrying tubes and a gas side;
  a second liquid to gas heat exchanger with a liquid side including a plurality of liquid carrying tubes and a gas side; and
  the gas separator means comprise a first gas separator means for receiving the mixture of second gas and liquid from the first heat exchanger and separating the second gas from the liquid; and further including:
  second liquid flow divider means for delivering liquid from the liquid side of the first heat exchanger to the liquid side of the second heat exchanger with substantially uniform flows of liquid to the respective tubes of the second heat exchanger;
  compressor means for compressing a third gas; and
  second injector means for injecting the third gas under pressure into the respective flows of the liquid before the liquid passes through the second heat exchanger tubes; and
  second gas separator means for separating the third gas from the liquid after the mixture of third gas and liquid has passed through the second heat exchanger.

15. Apparatus according to claim 14 including means for recycling the liquid from the second heat exchanger to the first heat exchanger.

16. Apparatus according to claim 13 wherein:
  the heat exchange means comprises:
    a first liquid to gas heat exchanger with a liquid side including a plurality of liquid carrying tubes and a gas side; and
    a second liquid to gas heat exchanger with a liquid side including a plurality of liquid carrying tubes and gas side; and
  said apparatus further includes
    means for delivering the mixture of second gas and liquid from the liquid side of the first heat exchanger to the liquid side of the second heat exchanger.

17. Apparatus according to claim 16 wherein the means for delivering the mixture of second gas and liquid from the first heat exchanger to the second heat exchanger comprises a plurality of tubes each connecting a liquid tube of the first heat exchanger to a respective liquid tube of the second heat exchanger.

18. Apparatus according to claim 16 wherein the gas separator means comprise means for receiving the mixture of second gas and liquid from the second heat exchanger and separating the second gas from the liquid.

19. Apparatus according to claim 13 wherein the injector means comprise means for injecting the second gas into the respective flows of liquid at a rate that will provide an equal quality in each tube.

20. Apparatus according to claim 13 wherein the heat exchange means comprises:
  a first liquid to gas heat exchanger with a liquid side and a gas side; and
  a second liquid to gas heat exchanger with a liquid side connected in series with the liquid side of the first heat exchanger and a gas side,
  and wherein the gas separator means is connected to the heat exchange means for receiving the mixture of second gas and liquid from the first heat exchanger and separating the second gas from the liquid before the liquid is delivered to the second heat exchanger.

21. A heat recovery system comprising:
exhaust means for exhausting spent gas;
inlet means for admitting fresh gas;
exhaust heat exchange means operatively associated with the exhaust means for extracting heat from the spent gas;
inlet heat exchange means operatively associated with the inlet means for supplying heat to the fresh gas;
circulating means for circulating a coupling liquid sequentially through the exhaust and inlet heat exchange means;
compressor means for pressurizing a heat exchange gas;
means for injecting the heat exchange gas under pressure into the coupling liquid upstream of at least one of the heat exchangers; and
means for withdrawing the heat exchange gas from the coupling liquid downstream of at least one of the heat exchangers.

22. A heat recovery system comprising:
exhaust means for exhausting spent gas;
inlet means for admitting fresh gas;
exhaust heat exchange means operatively associated with the exhaust means for extracting heat from the spent gas;
inlet heat exchange means operatively associated with the inlet means for supplying heat to the fresh gas;
circulating means for circulating a coupling liquid sequentially through the exhaust and inlet heat exchanger means;
means for injecting gas under pressure into the coupling liquid upstream of at least one of the heat exchangers; and
means for withdrawing the gas from the coupling liquid downstream of at least one of the heat exchangers.

23. A heat exchange apparatus comprising:
means exchange means including at least one liquid to gas heat exchanger with a liquid side including a plurality of liquid carrying tubes and a gas side;
liquid flow divider means for passing uniform flows of liquid through the respective tubes of the liquid side of the heat exchanger;
means for passing a first gas through the gas side of the heat exchanger;
compressor means for pressurizing a second gas;
injector means for injecting the second gas under pressure into the respective flows of liquid before the liquid passes through the heat exchanger tubes; and
control means for controlling the ratio of the second gas to the liquid.

24. A heat exchange apparatus comprising:
heat exchange means including at least one liquid to gas heat exchanger with a liquid side including a plurality of liquid carrying tubes and a gas side;
liquid flow divider means for passing uniform flows of liquid through the respective tubes of the liquid side of the heat exchanger;
means for passing a first gas through the gas side of the heat exchanger;
compressor means for pressurizing a second gas;
injector means for injecting the second gas under pressure into the respective flows of liquid before the liquid passes through the heat exchanger tubes, the gas injector means comprises means for controlling the rate of injection of the second gas to provide an equal quality in each tube.

25. In a liquid to gas heat exchanger having a liquid side including a plurality of liquid carrying tubes and a gas side, means for passing a liquid through the tubes of the liquid side of the heat exchanger and means for passing a first gas through the gas side of the exchanger for heat exchange with the liquid, the invention comprising means for pressurizing a second gas, means for injecting the second gas under pressure into the liquid passing through the liquid side of the heat exchanger to provide a two-phase flow through the tubes of the liquid side of the heat exchanger, and means for controlling heat transfer between the liquid and gas sides of the heat exchanger by controlling the ratio of second gas to liquid passing through the liquid side of the heat exchanger.

* * * * *